(12) United States Patent
Li et al.

(10) Patent No.: US 8,718,378 B2
(45) Date of Patent: May 6, 2014

(54) IMAGE TOPOLOGICAL CODING FOR VISUAL SEARCH

(75) Inventors: Zhu Li, Palatine, IL (US); Xin Xin, Evanston, IL (US); Aggelos K. Katsaggelos, Chicago, IL (US)

(73) Assignee: FutureWei Technologies, Inc., Plano, TX (US)

( * ) Notice: Subject to any disclaimer, the term of this patent is extended or adjusted under 35 U.S.C. 154(b) by 194 days.

(21) Appl. No.: 13/340,398

(22) Filed: Dec. 29, 2011

(65) Prior Publication Data

US 2013/0016912 A1    Jan. 17, 2013

Related U.S. Application Data

(60) Provisional application No. 61/506,612, filed on Jul. 11, 2011.

(51) Int. Cl.
*G06K 9/48*      (2006.01)

(52) U.S. Cl.
USPC .......................................................... 382/197

(58) Field of Classification Search
USPC .................. 382/100; 380/240, 243, 247, 255; 358/3.28; 705/50, 57–59; 707/712; 713/176, 179; 715/202, 240–243
See application file for complete search history.

(56) References Cited

U.S. PATENT DOCUMENTS

| | | | | |
|---|---|---|---|---|
| 6,073,258 | A * | 6/2000 | Wheater | 714/718 |
| 7,194,483 | B1 * | 3/2007 | Mohan et al. | 707/600 |
| 7,606,819 | B2 * | 10/2009 | Audet et al. | 707/102 |
| 7,622,182 | B2 * | 11/2009 | Wang et al. | 428/204 |
| 8,380,647 | B2 * | 2/2013 | Perronnin et al. | 706/15 |

FOREIGN PATENT DOCUMENTS

| | | |
|---|---|---|
| CN | 1710608 A | 12/2005 |
| CN | 101859326 A | 10/2010 |
| EP | 2172875 A1 | 4/2010 |
| KR | 20100104581 A | 9/2010 |

OTHER PUBLICATIONS

Lowe, D., et al., "Object Recognition from Local Scale-Invariant Features", Computer Vision, The Proceedings of the Seventh IEEE International Conference, 1999, pp. 1150-1157, vol. 2.

Xiaofei, H., et al., "Face Recognition Using Laplacianfaces", IEEE Transactions on Pattern Analysis and Machine Intelligence, 2005, pp. 1-13, vol. 27, No. 3.

Bay, H., et al., "SURF: Speeded Up Robust Features", Computer Vision and Image Understanding (CVIU), 2008, pp. 346-359, vol. 110, No. 3.

Ding, C., et al., "Linearized Cluster Assignment via Spectral Ordering," Proceedings of the 21st International Conference on Machine Learning, 2004, 8 pages.

(Continued)

*Primary Examiner* — Jose Couso
(74) *Attorney, Agent, or Firm* — Slater & Matsil, L.L.P.

(57) ABSTRACT

A method and an apparatus for processing an image generate a first vector of a first number dimension for the image from a first number of points of the image based on topological information of the first number of points, and the first vector for the image is invariant to rotation and scaling in creating the image. The first number of points may be locations of a set of rotation and scaling invariant feature points for the image, and the generated first vector may be a graph spectrum of a pair-wise distance matrix generated from the first number of points of the image.

18 Claims, 3 Drawing Sheets

(56) References Cited

OTHER PUBLICATIONS

"International Search Report," International Application No. PCT/CN2012/070013, mailing date: Apr. 19, 2012, 3 pages.

Reznik, Y.A., "On MPEG Work Towards a Standard for Visual Search," MPEG-7 CDVS, 8th FP7 Networked Media Concentration meeting, Dec. 13, 2011, 23 pages.

* cited by examiner

IMAGE TOPOLOGICAL CODING FOR VISUAL SEARCH

This application claims the benefit of U.S. Provisional Application No. 61/506,612, filed on Jul. 11, 2011, entitled "Topological Coding and Verification with Graph Spectral Analysis," which application is hereby incorporated herein by reference in its entirety.

TECHNICAL FIELD

The present invention generally relates to image processing, and in particular, example embodiments provide for topological coding of a point set of images with applications in visual search.

BACKGROUND

Modern-era mobile phones, handsets, tablets, mobile terminals, mobile devices, or user equipments have evolved into powerful image- and video-processing devices, equipped with high-resolution cameras, color displays, and hardware-accelerated graphics. With the explosive growth of mobile devices, like android, iPhone, mobile based multimedia visual services are enjoying intense innovation and development. Application scenarios of mobile visual search services can be location based services, logo search, and so on, where one image or multimedia sent from a mobile device is matched to another one stored in a database or an image repository. First deployments of mobile visual-search systems include Google Goggles, Nokia Point and Find, Kooaba, and Snaptell.

The image queries sent by mobile devices through a wireless network are usually computationally expensive, requiring prohibitively high communication cost, and cannot support real time operations. In popular applications where a mobile device captures a picture of certain objects and sends it as a query over a wireless network to search a large repository, reducing the bit rate while preserving the matching accuracy is a main concern and a main focus of the standardization effort under MPEG.

Visual descriptors or image descriptors can be used as queries instead of an image for visual search purposes. However, for mobile devices, visual descriptors are usually still very heavy as they comprise of hundreds of scale and rotation invariant feature points, as well as their locations. An example feature point of scale-invariant feature transform (SIFT) comprises of 128 dimension with 2048 bits. Another example feature point of speeded up robust features (SURF) comprises of 64 dimension with 1024 bits. Reducing the size of the feature points may compromise the performance of the searching and matching accuracy in visual search services.

A point set of the images instead of the complete image may be sent by a mobile device to search the image repository. A point set may be sent at the same time or separately from sending the feature points of an image for visual search. Therefore a point set can be used to search and match images in visual search as well, in addition to the feature point search.

SUMMARY

With explosive growth of visual content repository in the Internet, a visual search scheme that can support query-by-capture over the wireless link becomes attractive in a number of applications. In this disclosure, a visual search system that manipulates a point set of an image to generate a topologically encoded vector to represent the image which can be used to search and identify an image is disclosed. The topologically encoded vector of the point set of the image is small which can facility efficient image search and identification. The topologically encoded vector is also invariant to rotation and scaling in creating the image.

In accordance with an example embodiment, a method for processing an image is provided. The method generates a first vector of a first number dimension for the image from a first number of points of the image based on a topological information of the first number of points, and the first vector for the image is invariant to rotation and scaling in creating the image. The first number of points may be locations of a set of rotation and scaling invariant feature points for the image, and the generated first vector may be a graph spectrum of a pair-wise distance matrix generated from the first number of points of the image. Furthermore, the graph spectrum is computed as an eigen value eigenvalue(L) for a graph Laplacian matrix L=S−W, wherein S is a diagonal matrix with entry $$s_{k,k} = \sum_{j=1}^{n} w_{j,k},$$

n is first number of points, and W is an affinity matrix defined by $w_{j,k} = e^{-\alpha \|X_j - X_k\|}$, $\|X_j - X_k\|$ is a distance between a first point $X_j$ and a second point $X_k$ of the first number of points.

In accordance with an example embodiment, a method for processing an image is provided. The method generates a first vector of a first number dimension for the image from a first number of points of the image. The method may further compress the first vector of the first number dimension by a compression method to generate a second vector of a second number dimension. For example, the compression method may be a discrete cosine transform (DCT).

In accordance with an example embodiment, a method for processing an image is provided. The method generates a first vector of a first number dimension for the image from a first number of points of the image. The method may further match the image and an additional image when a distance between the first vector for the image and a second vector for the additional image is less than a threshold value, wherein the second vector of a second number dimension for the additional image is generated from a second number of points of the additional image based on a topological information of the second number of points, and the second vector for the additional image is invariant to rotation and scaling in creating the additional image. According to some embodiment, the threshold value may be generated from an image repository containing the additional image, the first number equals to the second number. The method may be used in a visual search to match the image to the additional image stored in an image repository.

In accordance with an example embodiment, an apparatus for processing an image is provided. The apparatus comprises a receiver configured to receive a first number of points of the image, and a topological encoding unit located in a user equipment or a base station of a wireless system. The topological encoding unit may be configured to generate a first vector of the first number dimension for the image from the first number of points of the image based on a topological information of the first number of points, and the first vector for the image is invariant to rotation and scaling in creating the image. The first number of points may be locations of a set of rotation and scaling invariant feature points. The first vector may be a graph spectrum of a pair-wise distance matrix generated from the first number of points of the image. According to some embodiment, the graph spectrum is computed as an eigen value eigenvalue(L) for a graph Laplacian matrix L=S−W, wherein S is a diagonal matrix with entry $$s_{k,k} = \sum_{j=1}^{n} w_{j,k},$$

n is first number of points, and W is an affinity matrix defined by $w_{j,k}=e^{-\alpha\|X_j-X_k\|}$, $\|X_j-X_k\|$ is a distance between a first point $X_j$ and a second point $X_k$ of the first number of points. The apparatus may further comprise a compression unit configured to compress the first vector of a first number dimension by a compression method to generate a second vector of a second number dimension, using for example, a discrete cosine transform (DCT) compression method.

In accordance with an example embodiment, an apparatus for processing an image is provided. The apparatus may comprise a receiver configured to receive a first topologically encoded vector generated based on a topological information of a first number of points of a first image, wherein the first topologically encoded vector of the first image is invariant to rotation and scaling in creating the first image, and a searching unit configured to match the first topologically encoded vector of the first image to a second topological encoded vector generated based on topological information of a second number of points of a second image when a distance between the first topologically encoded vector and the second topologically encoded vector is less than a threshold value, wherein the second topologically encoded vector of the second image is invariant to rotation and scaling in creating the second image, the second image is stored in an image repository, and the threshold value is determined by information related to the image repository. According to some embodiments, the first number of points are locations of a first set of rotation and scaling invariant feature points for the first image; the second number of points are locations of a second set of rotation and scaling invariant feature points for the second image; the first topologically encoded vector is a graph spectrum of a pair-wise distance matrix generated from the first number of points of the first image; and the second topologically encoded vector is a graph spectrum of a pair-wise distance matrix generated from the second number of points of the second image. Furthermore, the second topologically encoded vector is generated by a device from the second number of points of the second image when the searching unit is to match the first topologically encoded vector to the second topological encoded vector, or the second topologically encoded vector is generated by a device from the second number of points of the second image before the searching unit is to match the first topologically encoded vector to the second topological encoded vector.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

As will be more fully explained below, a visual search system that manipulates a point set of an image to generate a topologically encoded vector to represent the image which can be used to search and identify an image is disclosed. The topologically encoded vector of the point set of the image is small which can facility efficient image search and identification. It is also invariant to rotation and scaling in creating the image.

Figure 1A:
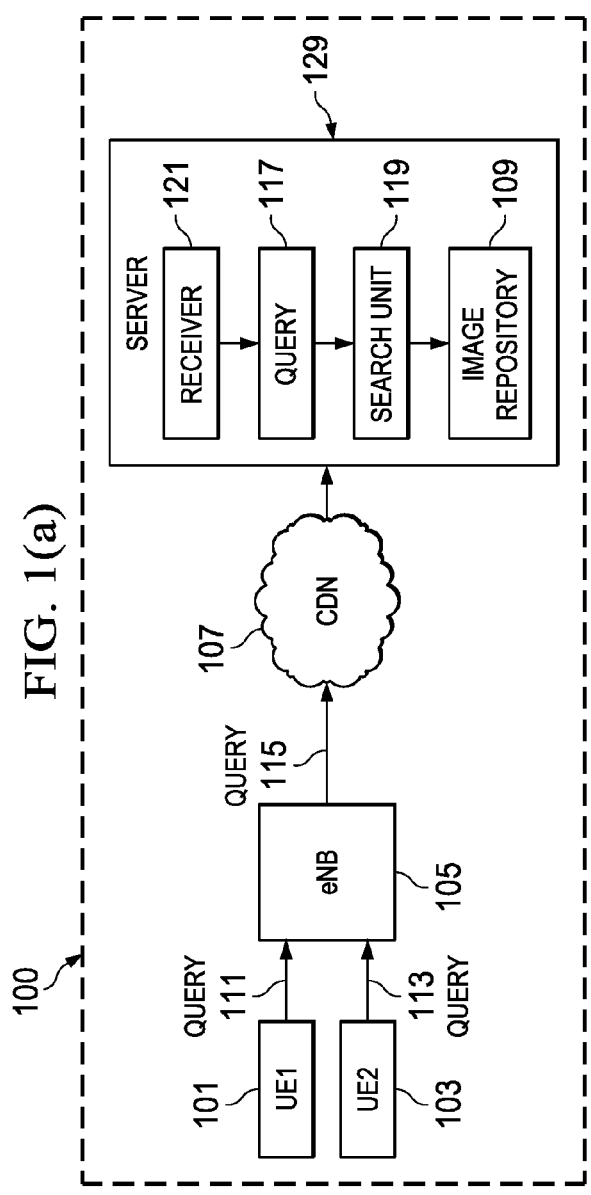
FIGS. 1(a) and 1(b) illustrate an example of a content distribution network and a visual search system with mobile devices.

FIG. 1(a) illustrates an example visual search system where a mobile device or a user equipment (UE) UE1 101 or UE2 103 sending multimedia queries 111 or 113 through a base station 105 and a content distribution network (CDN) 107. The terms mobile phones, handsets, tablets, mobile terminals, mobile devices, or user equipments are used in an interchangeable way. The query is received by the receiver 121 within the server 129 as the query 117, which is used by a searching unit 119 to search in an image repository 109. The UE1 101, UE2 103, or the base station eNB 105 may be collectively referred as clients and the server 129 comprising the receiver, the search unit, and the image repository may be collectively referred as a server 129.

The visual search system may be location based services, logo search, and so on. The UEs 101 and 103 may be connected to base stations eNB 105 through wireless communication channels. The UEs 101 and 103 may be a mobile phone, a user terminal, mobile station, iPHONE, or any other similar devices. There may be a different number of UEs connected to the base station eNB 105. A UE may send a plurality of queries to the base station.

Figure 1B:
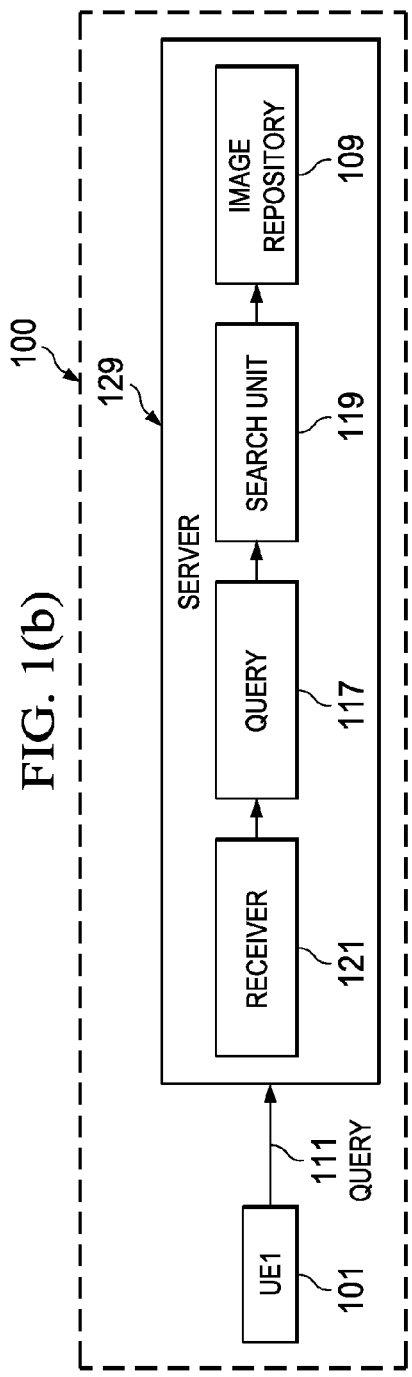

The UEs 101, 103, the base station 105, and the CDN 107 may be part of a Long Term Evolution (LTE) wireless system, a Long Term Evolution Advanced (LTE-A) system, an IEEE802.16m system, or any other kind of wireless system. The visual search system illustrated in FIG. 1(a) may be implemented in other ways, and represented in an abstract level illustrated in FIG. 1(b), where a UE1 101 is connected to an image repository 109, and UE1 101 sends a query 111 received by the server as 117 query received, which is used to search the image repository 109 within a server 129.

The queries 111 and 113 are sent from the UEs 101 and 103 to a base station 105. The base station 105 may directly transfer the query 111 or 113 to the server and received by the receiver 121 to become the query 117. The base station 105 may perform certain operations on the query 111 or 113 to generate a different query 115 and send the query 115 through the CDN 107 and received by the receiver 121.

If the query 111 sent from the UE and the received query 117 are an image, the image query may be used to search and match to images stored in the database or image repository 109. Typically, this is accomplished using special index structures. The image based queries are usually computationally expensive, requiring additional prohibitive communication cost, and cannot support real time operation required by CDN applications.

The query 111 or the query 117 may be visual descriptors. Visual descriptors or image descriptors are descriptions of the visual feature points of the contents in images, videos or in components or modules that produce such descriptions. They describe elementary characteristics such as the shape, the color, the texture, or the motion, among others, and they allow the quick and efficient searches of the audio-visual content. High discriminating descriptors include speeded up robust features (SURF) and scale-invariant feature transform (SIFT), which are robust image detectors and descriptors. In visual search applications, the matching ability of the descriptors of the query image to the descriptors of the database image is critical to a successful matching.

Visual descriptors may represent visual objects and points of interest as a set of feature points, which may be scale and rotation invariant, or any other properties. When visual descriptors are used to match images, the query 117 may be a set of feature points extracted from an image. A collection of these feature points and their topological information, such as a set of feature points $\{F_j | j=1, \ldots, n\}$ where each feature point $F_j$ located in image position $\{x_j, y_j\}$, gives unique representation of certain objects invariant to scale, rotation, and some degree of view angle changes. The set may consist of hundreds (e.g, 242) of feature points. Matching two images may be equal to matching two sets of feature points in the images and the number of matched features is used as an indicator for match.

A feature point $F_j$ is a point in $R^{n_j}$, where $n_j$ is the dimension of the feature point $F_j$, and a feature dimension $i \in R^{n_j}$ for the feature point $F_j$ has a $p_i$ bit precision represented by $p_i$ bits. This may be called the resolution of the feature point at the dimension i. For a set of feature points, the feature point in the set may have the same dimension or different dimensions.

However, for mobile devices, visual descriptors are usually still very heavy as they comprise of hundreds of scale and rotation invariant feature points, as well as their locations. An example feature point of scale-invariant feature transform (SIFT) comprises of 128 dimension with 2048 bits. Another example feature point of speeded up robust features (SURF) comprises of 64 dimension with 1024 bits. Reducing the size of the feature points may compromise the performance of the searching and matching accuracy in visual search services.

The query 111 or the query 117 may be a point set of the image instead of the complete image or a visual descriptor, sent by a mobile device to search the image repository. A point set may be sent at the same time or separately from sending the feature points of an image for visual search. Therefore a point set can be used to search and match images in visual search as well, in addition to the feature point search. A point set can be used to search and match images in visual search independently, without being used together with the feature points.

Figure 2:
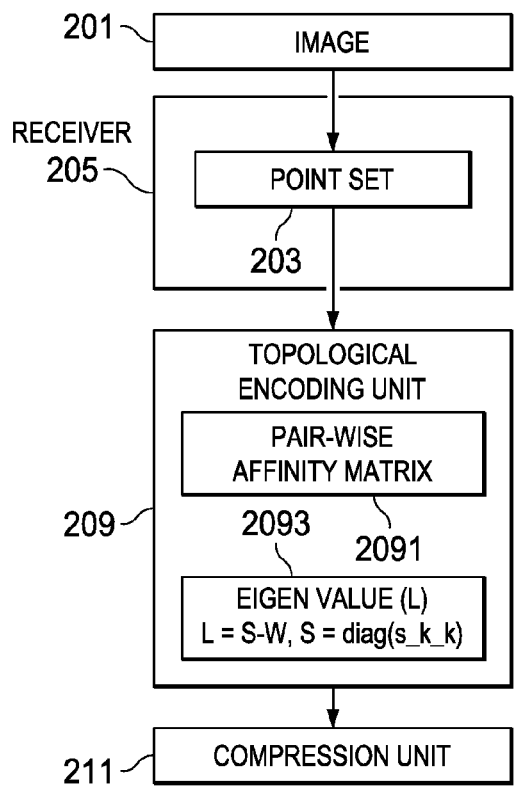
FIG. 2 illustrates a sequence of operations performed on an image to represent an image by a point set, perform topological encoding of the point set, and compress the topological encoding.

FIG. 2 illustrates an operation flow performed by an apparatus which may be used when using a point set to perform visual search in an embodiment of the present invention. The operations illustrated in FIG. 2 may be performed by a mobile device, base station, or by the combination of a mobile device and a base station, or any other components in a network.

An image is provided at 201. A point set 203 may be extracted from the image in a receiver 205. According to an embodiment, the point set may be extracted related to a set of feature points, performed by a mobile device or a base station. When a set of a collection of scale and rotation invariant feature points such as SURF and SIFT feature points may be used as visual descriptors, those feature points may be found in a visual object by edge detection across multiple scales. In an example embodiment, only those points with strong edge info consistent across scale are selected to be feature points. Rotation invariance is achieved by descriptor that describes the edge orientations. A feature point set may comprise of hundreds of scale and rotation invariant feature points, as well as their locations in the original image. The location of the set of feature points in the original image may be the point set 203 generated in receiver 205. Other visual descriptor feature points may be extracted as well instead of SURF or SIFT. The use of SURF and SIFT are for illustration purposes only and are not limiting. Other point sets of the image may be used as well in step 203 instead of locations for SURF or SIFT feature points.

A topologically encoded vector of the point set 203 is generated, for example, a topological encoding unit 209 may be used to generate a topologically encoded vector of the point set 203. The topologically encoded vector for the image is invariant to rotation and scaling in creating the image, and may be generated based on the topological information of the point set. In an example embodiment, the topologically encoded vector may be a graph spectrum of a pair-wise affinity matrix 2091 generated from the point set of the image. The topologically encoded vector may be calculated as an eigen value 2093 of a Laplacian matrix L=S−W, where W is an affinity matrix defined by $w_{j,k} = e^{-a\|X_j - X_k\|}$, $\|X_j - X_k\|$ is a distance between a first point $X_j$ and a second point $X_k$ of the point set of the image.

According to an embodiment, a compression may be performed by a compression unit 211 using a compression method which compresses the topologically encoded vector of the point set to generate a compressed vector. For example, the compression method may be a discrete cosine transform (DCT). There may be other compression method used as well. There may be multiple compression methods used in sequence to compress the topologically encoded vector of the point set.

Figure 3:
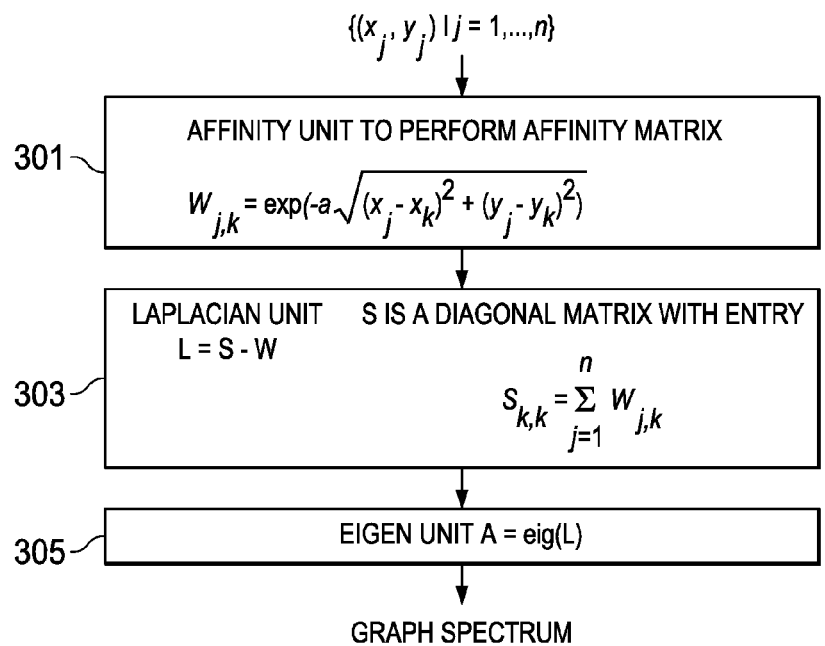
FIG. 3 illustrates a process for topological encoding.

FIG. 3 illustrates one embodiment of how to find the topologically encoded vector of the point set. The topologically encoded vector of the point set $\{(x_j, y_j) | j=1, \ldots, n\}$ depends on the affinity matrix generated by an affinity unit in step 301. As an example embodiment, the affinity matrix may be defined as $w_{j,k} = e^{-a\|X_j - X_k\|}$, $\|X_j - X_k\|$ is a distance between a first point $X_j$ and a second point $X_k$ of the point set, and the size of the affinity matrix is n*n, where n is the number of points in the point set. Next, the Laplacian matrix L=S−W is computed by the Laplacian unit 303, wherein S is a diagonal matrix with entry $$s_{k,k} = \sum_{j=1}^{n} w_{j,k},$$

wherein n is first number of points. Finally, the graph spectrum is computed by eigen unit 305 as an eigen value eigenvalue(L) for a graph Laplacian matrix L=S−W. Various graph cut costs may be computed by solving its Laplacian eigenvalue problems. The resulting topological code is scalable, i.e, the first k eigenvalues may be used to represent this point set.

Figure 4:
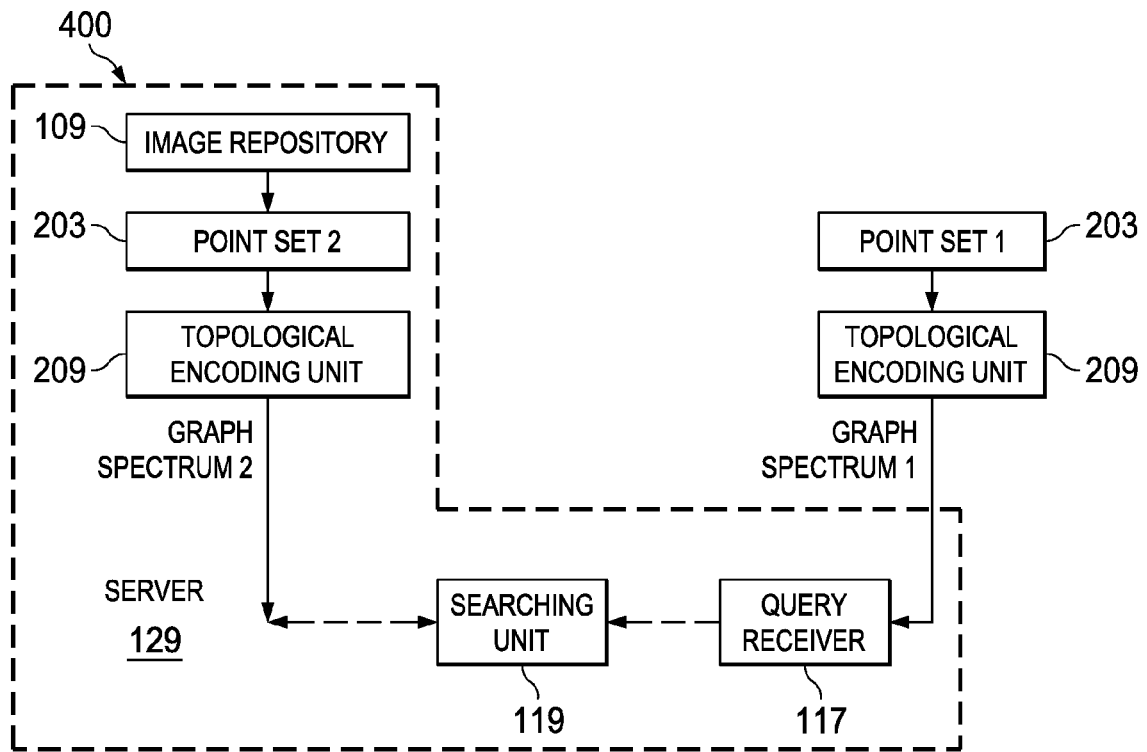
FIG. 4 illustrates a process for matching two images represented by two point sets.

FIG. 4 illustrates an embodiment of an apparatus 400 to search a first image using the topologically encoded vector of its point set, which may be its graph spectrum, within an image repository 109. Such a search may be performed by the server 129 illustrated in FIG. 1. The search is based on the topologically encoded vector of the first image, which may be generated by the apparatus illustrated in FIG. 3, as the graph spectrum. The graph spectrum generated by a topological encoding unit 209 may be received by a query receiver 117. A search unit 119 searches the image repository 109 using the received topologically encoded vector of the first image. As an example embodiment, if the received query is a compressed topologically encoded vector, any necessary operation may be performed to un-compress the compressed topologically encoded vector to recover the topologically encoded vector.

According to an embodiment, the searching unit 119 is used to match the first graph spectrum for the first image to a second topologically encoded vector, which is a second graph spectrum, for a second image stored in the image repository 109. The second topologically encoded vector is generated based on a topological information of a second number of points of the second image.

As an example embodiment, the image repository 109 may also store a point set of the image in addition to the image itself, which contains the second number of points of the second image. The point set of the second image may be stored in a separate device from the image repository 109. It may be possible that the point set of the first image and the point set of the second image used to generate the topologically encoded vectors have the same number of points of each image. The second number of points may be locations of a second set of rotation and scaling invariant feature points for the second image.

As illustrated in FIG. 4, the second topologically encoded vector may be generated by a device from the second number of points of the second image when the searching unit is to match the first topologically encoded vector to the second topological encoded vector. Such topologically encoded vectors may also be generated by a device from the second number of points of the second image before the searching unit is to match the first topologically encoded vector to the second topological encoded vector. In an example embodiment, the pre-match generated topologically encoded vectors may be stored in the image repository 109, or may be stored in a separate storage unit.

For the searching unit 119 to decide a match between two topologically encoded vectors, when a distance between the first topologically encoded vector of the first image and the second topologically encoded vector of the second image is less than a threshold value, the searching unit 119 may decide that a match is found. As an example, the threshold value may be generated from the image repository 109 containing the second image. The searching and matching method performed by a matching unit may be used in a visual search to match the first image to the second image stored in an image repository.

Figure 5:
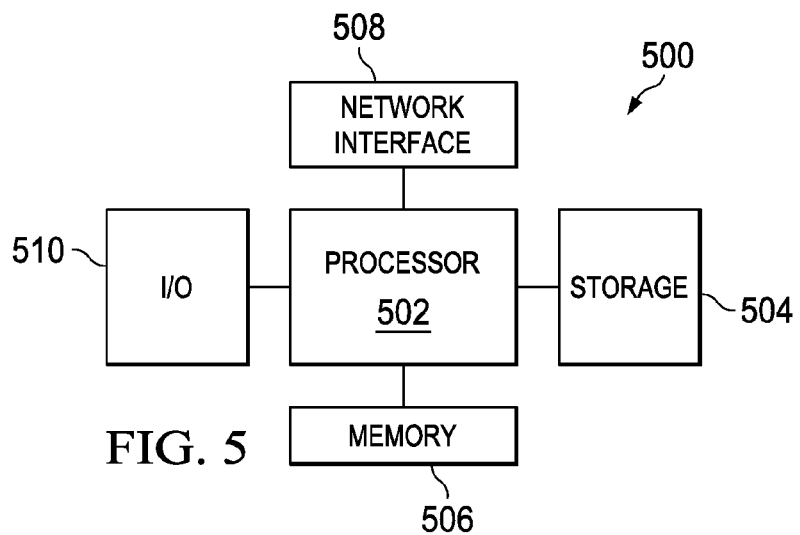
FIG. 5 illustrates an example implementation of the method.

Through the descriptions of the preceding embodiments, the present disclosure may be implemented by using hardware only or by using software and a necessary universal hardware platform. FIG. 5 illustrates one example of a unit or a controller 500 according to an embodiment of the invention. Unit 500 may be used in conjunction with and may perform the functions described in the disclosure. In the same or alternative embodiments, controller 500 may reside at, be component of, or may be used by one or more UEs, eNBs, and servers.

The unit 500 may contain a processor 502 that controls the overall operation of the controller 500 by executing computer program instructions which define such operation. Processor 502 may include one or more central processing units, read only memory (ROM) devices and/or random access memory (RAM) devices. The processor 502 may be an ASIC, a general purpose processor, a Digital Signal Processor, a combination of processors, a processor with dedicated circuitry, dedicated circuitry functioning as a processor, and a combination thereof.

The computer program instructions may be stored in a storage device 504 (e.g., magnetic disk, database, etc.) and loaded into memory 506 when execution of the computer program instructions is desired. Thus, applications for performing the herein-described method steps, such as precoding, scheduling, transmitting and receiving data can be defined by the computer program instructions stored in the memory 506 or storage 504 and controlled by the processor 502 executing the computer program instructions.

In alternative embodiments, hard-wired circuitry or integrated circuits may be used in place of, or in combination with, software instructions for implementation of the processes of the present invention. Thus, embodiments of the present invention are not limited to any specific combination of hardware, firmware, or software. The memory 506 may store the software for the controller 500, which may be adapted to execute the software program and thereby operate in accordance with the present invention and particularly in accordance with the methods described in detail above. However, the invention as described herein could be implemented in many different ways using a wide range of programming techniques as well as general purpose hardware sub-systems or dedicated controllers.

The unit 500 may also include one or more network interfaces 508 for communicating with other devices via a network. In wireless portions of the network, the network interface could include an antenna and associated processing. In wired portions of the network, the network interface could include connections to the cables that connect the unit to other units. In either case, the network interface could be thought of as circuitry for accessing the physical communications portions (such as the antenna).

The unit 500 could also include input/output devices 510 (e.g., display, keyboard, mouse, speakers, buttons, etc.) that enable user interaction with the controller 500. These user I/O devices are optional and not needed if the unit 500 is accessed by the network interfaces only.

An implementation of unit 500 could contain other components as well, and that the controller of FIG. 5 is a high level representation of some of the components of such a controller for illustrative purposes.

Embodiments of the present disclosure provide a number of new and advantageous features. For example, one embodiment provides a new visual feature description compression scheme that achieves very high accuracy at very low bit rate. Another embodiment provides a compression scheme that is scalable in bit rate and accuracy. Embodiments of the present invention can be used in a variety of products, processes and services. Some examples of these implementations include Cloud Based Media Processing, Next gen CDN product, CDN measure and operations. Embodiments are desirable because they can provides real-time, low computation/communication cost Quality of Experience (QoE) estimation at the client. For example, a robust QoE estimator with light weight video signature and minimum cost in computing and communication resources can be achieved. This would be useful in the CDN and wireless multi-media market.

Although the present embodiments and their advantages have been described in detail, it should be understood that various changes, substitutions and alterations can be made herein without departing from the spirit and scope of the embodiments as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for processing an image, the method comprising:
generating, by a processor, a first vector of a first number dimension for the image from a first number of points of the image based on a topological information of the first number of points, wherein the first vector for the image is invariant to rotation and scaling in creating the image, and wherein the first vector is a graph spectrum of a pair-wise distance matrix generated from the first number of points of the image.

2. The method of claim 1, wherein the first number of points are locations of a set of rotation and scaling invariant feature points for the image.

3. The method of claim 1, wherein the graph spectrum is computed as an eigen value eigenvalue(L) for a graph Laplacian matrix L=S−W,
wherein S is a diagonal matrix with entry $$s_{k,k} = \sum_{j=1}^{n} w_{j,k},$$

wherein n is first number of points, and
wherein W is an affinity matrix defined by $w_{j,k}=e^{-a\|X_j-X_k\|}$, $\|X_j-X_k\|$ is a distance between a first point $x_j$ and a second point $x_k$ of the first number of points.

4. The method of claim 1, further comprising:
compressing the first vector of the first number dimension by a compression method to generate a second vector of a second number dimension.

5. The method of claim 4, wherein the compression method is a discrete cosine transform (DCT).

6. The method of claim 1, further comprising:
matching the image and an additional image when a distance between the first vector for the image and a second vector for the additional image is less than a threshold value,
wherein the second vector of a second number dimension for the additional image is generated from a second number of points of the additional image based on a topological information of the second number of points, and the second vector for the additional image is invariant to rotation and scaling in creating the additional image.

7. The method of claim 6, wherein the threshold value is generated from an image repository containing the additional image.

8. The method of claim 6, wherein the first number equals to the second number.

9. The method of claim 6, wherein the method is used in a visual search to match the image to the additional image stored in an image repository.

10. An apparatus for processing an image, the apparatus comprising:
a receiver configured to receive a first number of points of the image;
a processor comprising a topological encoding unit configured to generate a first vector of a first number dimension for the image from the first number of points of the image based on a topological information of the first number of points, and the first vector for the image is invariant to rotation and scaling in creating the image; and
the processor further comprising a compression unit configured to compress the first vector of the first number dimension by a compression method to generate a second vector of a second number dimension.

11. The apparatus of claim 10, wherein the first number of points are locations of a set of rotation and scaling invariant feature points.

12. The apparatus of claim 10, wherein the first vector is a graph spectrum of a pair-wise distance matrix generated from the first number of points of the image.

13. The apparatus of claim 12, wherein the graph spectrum is computed as an eigen value eigenvalue(L) for a graph Laplacian matrix L=S−W,
wherein S is a diagonal matrix with entry $$s_{k,k} = \sum_{j=1}^{n} w_{j,k},$$

wherein n is first number of points, and
wherein W is an affinity matrix defined by $w_{j,k}=e^{-a\|X_j-X_k\|}$, $\|X_j-X_k\|$ is a distance between a first point $X_j$ and a second point $X_k$ of the first number of points.

14. The apparatus of claim 10, wherein the compression method is a discrete cosine transform (DCT) compression.

15. The apparatus of claim 10, wherein the topological encoding unit is located in a user equipment or a base station of a wireless system.

16. An apparatus for processing an image, the apparatus comprising:
a receiver configured to receive a first topologically encoded vector generated based on a topological information of a first number of points of a first image, wherein the first topologically encoded vector of the first image is invariant to rotation and scaling in creating the first image; and
a processor comprising a searching unit configured to match the first topologically encoded vector of the first image to a second topological encoded vector generated based on topological information of a second number of points of a second image when a distance between the first topologically encoded vector and the second topologically encoded vector is less than a threshold value, wherein the second topologically encoded vector of the second image is invariant to rotation and scaling in creating the second image, the second image is stored in an image repository, and the threshold value is determined by information related to the image repository.

17. The apparatus of claim 16, wherein:

the first number of points are locations of a first set of rotation and scaling invariant feature points for the first image;

the second number of points are locations of a second set of rotation and scaling invariant feature points for the second image;

the first topologically encoded vector is a graph spectrum of a pair-wise distance matrix generated from the first number of points of the first image; and the second topologically encoded vector is a graph spectrum of a pair-wise distance matrix generated from the second number of points of the second image.

18. The apparatus of claim 16, wherein:

the second topologically encoded vector is generated by a device from the second number of points of the second image when the searching unit is to match the first topologically encoded vector to the second topological encoded vector, or the second topologically encoded vector is generated by a device from the second number of points of the second image before the searching unit is to match the first topologically encoded vector to the second topological encoded vector.

* * * * *